United States Patent [19]
Teichmann et al.

[11] Patent Number: 5,541,485
[45] Date of Patent: Jul. 30, 1996

[54] REACTIVE ROBOTIC GRIPPER

[75] Inventors: Marek Teichmann; Bhubaneswar Mishra, both of New York, N.Y.

[73] Assignee: New York University, New York, N.Y.

[21] Appl. No.: 239,083

[22] Filed: May 6, 1994

[51] Int. Cl.⁶ .................................................. G05B 19/12
[52] U.S. Cl. ...................... 318/568.21; 318/640; 901/32; 901/47
[58] Field of Search .................. 318/568.11, 568.16, 318/568.21, 577, 640; 901/9, 31, 32, 35, 47; 294/907

[56] References Cited

U.S. PATENT DOCUMENTS

| | | | |
|---|---|---|---|
| 4,766,322 | 8/1988 | Hashimoto | 901/9 X |
| 4,783,107 | 11/1988 | Parker et al. | 294/88 |
| 4,911,490 | 3/1990 | Akagawa | 294/88 |
| 4,980,626 | 12/1990 | Hess et al. | 318/568.16 |
| 5,017,075 | 5/1991 | Block | 414/225 |
| 5,046,773 | 9/1991 | Modesitt | 294/100 |
| 5,052,875 | 10/1991 | Miller et al. | 414/403 |
| 5,067,085 | 11/1991 | Wenzel et al. | 364/474.06 |
| 5,090,757 | 2/1992 | Huber et al. | 294/88 |
| 5,176,492 | 1/1993 | Nakamura | 414/730 |
| 5,177,563 | 1/1993 | Everett et al. | 356/375 |
| 5,186,515 | 2/1993 | Goldberg et al. | 294/119.1 |
| 5,215,423 | 6/1993 | Schuite-Hinsken et al. | 414/408 |
| 5,219,264 | 6/1993 | McClure et al. | 414/730 |
| 5,280,179 | 1/1994 | Pryor et al. | 250/561 |

OTHER PUBLICATIONS

A. S. Rao, et al., "Manipulating Algebraic Parts in the Plane", Dec. 1993, pp. 1–35.

A. S. Rao, et al., "Shape from Diameter: Recognizing Polygonal Parts with a Parallel–Jaw Gripper", Nov. 1993, pp. 37–76.

A. S. Rao, "Algorithmic Plans for Robotic Manipulation", PhD Thesis, University of Southern California, Los Angeles, CA, May 1993, pp. 1–15.

K. Y. Goldberg, "Stochastic Plans for Robotic Manipulation", Ph.D. Thesis, School of Computer Science, Carnegie Mellon University, Pittsburgh, PA, Aug. 1990, pp. 1–19.

D. Clark et al., "Teleoperating the Utah/MIT Hand with a VPL Dataglove", Tech. Report #169, New York University, Oct. 1988, pp. 1–16.

B. Mishra et al., "On the Existence and Synthesis of Multifinger Positive Grips", *Algorithmica*, No. 2, 1987, pp. 541–558.

R. Cole et al., "Shape from Probing", *J. Algorithms*, vol. 8, No. 1, 1987, pp. 19–38.

D. Dobkin et al., "Probing Convex Polytopes", *Proceedings of the 18th STOC*, 1986, pp. 424–432.

*Primary Examiner*—Brian Sircus
*Attorney, Agent, or Firm*—Kenyon & Kenyon

[57] ABSTRACT

A parallel jaw robotic gripper and method for operating the gripper to grasp an unknown object are disclosed. The parallel jaw gripper of the present invention includes two pairs of light sources and sensors mounted on opposing extensions of each gripper. The light sources and detectors on each jaw are used to produce and detect the interruption of a pair of parallel light beams and/or a pair of crossed light beams by the object to be grasped. The gripper is rotated, translated, and/or closed in accordance with the detected status of the light beams in a simple table-driven manner by which the gripper is positioned to grasp the object with a stable grasping configuration. The gripper of the present invention can grasp an object of an unknown shape without disturbing or touching the object before grasping it.

16 Claims, 4 Drawing Sheets

REACTIVE ROBOTIC GRIPPER

FILED OF THE INVENTION

The present invention relates to methods and apparatus for grasping objects with a robotic arm. More specifically, the present invention relates to a reactive method and apparatus for grasping an unknown flat object using a parallel jaw gripper.

BACKGROUND OF THE INVENTION

The conventional approach to grasping objects with a robotic arm has been to first assume an accurate model of the object to be grasped and with an off-line geometric algorithm to use that model to determine a set of grip points at which the gripping members, such as fingers, are to be placed. (See, for example, B. Mishra et al., "On the Existence and Synthesis of Multifinger Positive Grips", *Algorithmica*, 2:541–558, 1987). Once the grip points have been determined, the geometry of the object is deemed irrelevant and the grasp is determined and maintained by controlling the magnitudes of the forces at the grip points.

Such an approach, however, has not proven very useful in practice, having turned out to lack robustness. The only success in dexterous robotic manipulation of objects seems to have come from two directions: 1) telemanipulation, where a human in the loop uses much more sensory information than is assumed to be theoretically necessary (see D. Clark et al., "Teleoperating the Utah/MIT Hand with a VPL Dataglove", Tech. Report #169, New York University, September 1988), and 2) simple parallel jaw grippers, where grasping algorithms can be made immune to the lack of any sensory information. An example of an approach in the latter direction is to remove friction in the transversal direction between a jaw of the gripper and the grasped object. (See K. Y. Goldberg, "Stochastic Plans for Robotic Manipulation", Ph.D. Thesis, School of Computer Science, Carnegie Mellon University, Pittsburgh, Pa., 1990). In this approach, the basic gripper has been modified to reduce the friction between the gripper and the object being grasped. This friction occurs when the gripper is being closed on an object, and this object is forced to rotate.

There have been several studies on finding grasps for parallel jaw grippers when the object to be grasped is known. (See, e.g., A. S. Rao, et al., "Shape from Diameter: Strategies for Recognizing Polygonal Parts", Tech. Report #292, University of Southern California, Inst. of Robotics and Intelligent Systems (IRIS), Los Angeles, Calif., 1992; A. S. Rao, et al., "Grasping Curved Planar Parts with a Parallel Jaw Gripper", Technical Report #299, IRIS, August 1992). A more recent approach deals with grasping unknown objects by closing the gripper on an unknown object several times with the gripper at different orientations and measuring the jaw opening distance at each of the different orientations of the gripper. (See A. S. Rao, "Algorithmic Plans for Robotic Manipulation", PhD Thesis, University of Southern California, Los Angeles, May 1993). Although this scheme allows the determination of an unknown object, it also subjects the object to many motions.

Another method involves grasping an unknown object in random orientations to distinguish planar parts. In the computational geometry literature, there are several reported results on probing, such as by using finger probes (see, e.g., R. Cole et al., "Shape from Probing" *J Algorithms*, Vol 8, No 1, pages 11–38, 1987), or line and other probes (see, e.g., D. Dobkin et al., "Probing Convex Polytopes", Proceedings of the 18th

SUMMARY OF THE INVENTION

The present invention relates to a method and apparatus for controlling a parallel-jaw robotic gripper to locate an optimal grasp position and then grasping an unknown object without moving the object significantly. In an exemplary embodiment of a system in accordance with the present invention, each jaw of a standard parallel-jaw robotic gripper is provided with two light sources and two light detectors facing each other from extensions on both ends of the jaw. The gripper is controlled in accordance with a reactive grasping algorithm which is responsive to the states of the light-beams as detected by the detectors.

In accordance with the present invention, the gripper locates an optimal grasp position by first performing a series of line probes, using the light sources and detectors, on the object to be grasped. A light-beam is swept (either in a parallel or rotating motion of the gripper) until the object is hit by the light-beam, thereby causing an interruption in the light-beam as detected by a sensor. The line probe thus returns the position of the gripper at which the light-beam first hit the object. The gripper is then closed while constantly checking the status of the sensors, and performing actions according to that status, in a simple table-driven manner. The sensory information is selectively used to determine movements of the robotic gripper so that ultimately a grasp will be achieved independent of the quality of the sensory information or the reliability of the actuator movements.

The method and apparatus of the present invention can be used in grasping applications as well as in determining the shape (the convex hull) of a planar object, again without disturbing the object.

The method and apparatus of the present invention have the advantage, in contrast to known approaches, of not causing any movement of the object to be grasped except for the desired movements after grasping. Moreover, the grasp is achieved with as little prior knowledge as possible about the object.

The operation of the system of the present invention is also much smoother than known approaches. Unlike known systems, whose operation is characterized by phases of digital planning interrupted by analog actuation and sensing, in the system of the present invention, the actuators and sensors of the robotic gripper are themselves active parts of the controlling algorithm, performing "computations" much like an analog computer in conjunction with a digital computer.

DETAILED DESCRIPTION

Figure 1:
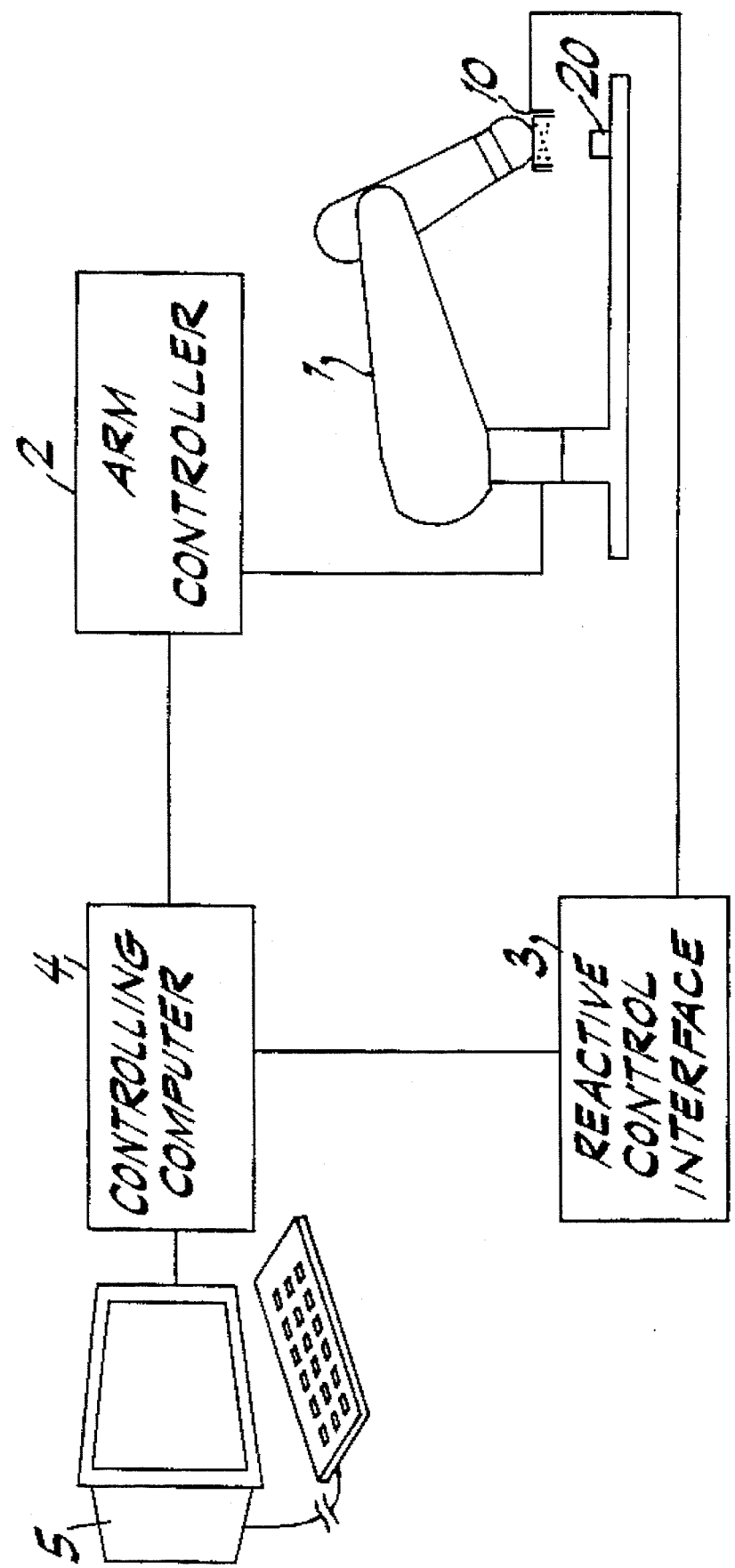
FIG. 1 is a block diagram of a reactive robotic gripper system of the present invention.

FIG. 1 is a block diagram of a robotic gripper system in accordance with the present invention. The major components comprising the system are a robotic arm 1, an arm controller 2, a reactive control interface 3, and a computer 4 (including a monitor 5 for any incidental human interaction). The robotic arm 1 includes a parallel jaw gripper 10 which is mounted at the end of the arm. The gripper 10 is capable of rotation and translation in three dimensions and can be opened and closed. The motions of the arm 1 are under the direct control of the arm controller 2. The arm controller 2 is coupled to the computer 4 which generates commands to the arm controller for actuation of the arm 1. Additionally, the gripper 10 is equipped with light sources and detectors (described in greater detail below), which are coupled to the reactive control interface 3 which is in turn coupled to the computer. As explained more fully below, optical sensors on the gripper 10 provide information to the computer 4 (via the interface 3) about the current position of the gripper 10 relative to an object 20 to be grasped. The computer 4, in turn, commands the arm 1 (via the arm controller 2) to respond accordingly.

Figure 2:
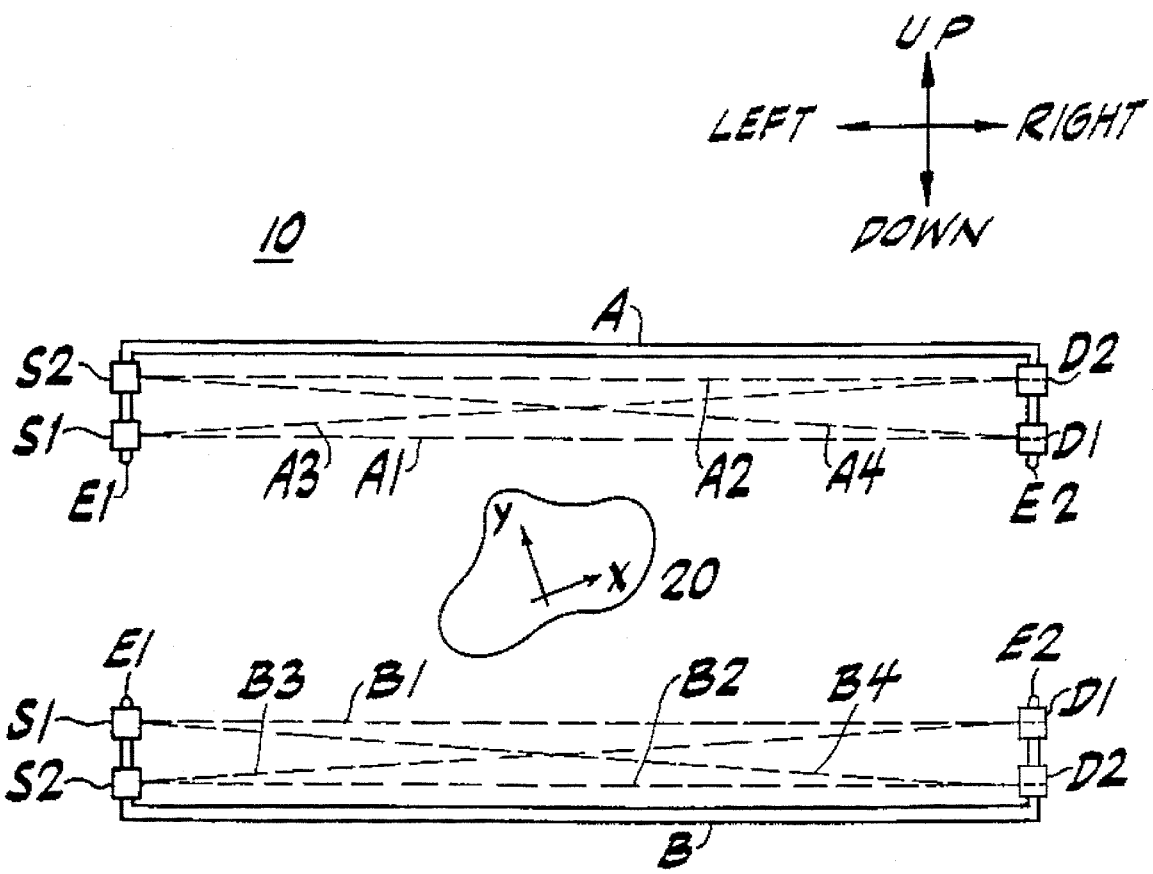
FIG. 2 is a plan view of a reactive robotic gripper of the present invention.

FIG. 2 is a plan view of an exemplary embodiment of the parallel jaw gripper 10 in accordance with the present invention. The gripper 10 is attached to the end of the robotic arm 1. The gripper 10 is comprised of two parallel jaws A and B. Each jaw is in the general shape of a shallow "U" with extensions E1 and E2 extending generally perpendicularly from each end of the body of the jaw.

The jaws A and B can be brought together or moved apart, translated in tandem either up or down (i.e., in a direction perpendicular to the jaw bodies), or left or right (i.e., in a direction parallel to the jaw bodies) or rotated in tandem either clockwise or counter-clockwise. In a typical application, the gripper 10 can also be translated in a third dimension (i.e., in a direction perpendicular to the plane of the drawing). For the purposes of describing the exemplary embodiment of FIG. 2, however, this degree of movement does not come into play once the gripper has been positioned with the object 20 between the jaws A and B.

FIG. 2 also shows the object 20 located between the jaws A and B. To grasp the object 20, the gripper 10 of the present invention will undergo a combined sequence of the above-mentioned motions, as will be described in greater detail below, leading ultimately with the jaws A and B being brought together to grasp the object 20 at a stable grasp point without first moving the object itself. Although, practically, the object 20 can have any 3-dimensional shape, for purposes of describing the exemplary embodiment, the object 20 will be treated as being substantially flat; i.e., it has the cross-section shown in FIG. 2, which cross-section is uniform through-out its height. In the alternative, the object 20 can be thought of as having the cross-section shown in FIG. 2 in that plane which includes the jaws A and B. Moreover, the maximum diameter of the object 20 is assumed to be smaller than the length of the jaws A and B (i.e., the distance between the jaw extensions E1 and E2). Additionally, in a practical setting the object 20 can initially be anywhere relative to the gripper 10. For purposes of describing the exemplary embodiment, however, it will be assumed that the object 20 is located between the jaws A and B, but at some random orientation.

Each jaw A and B has a pair of light sources, S1 and S2 (typically infrared light-emitting diodes), and a pair of optical detectors, D1 and D2 (infrared detectors), mounted thereon. The light sources S1 and S2 are both mounted on jaw extension E1 with the source S1 being further out on the extension (or rather further in towards the center of the gripper) than the source S2. The detectors D1 and D2 are mounted on the opposing jaw extension E2 at respectively the same points on the extension E2 as are the sources S1 and S2 on the extension E1. In other words, S1 and D1 are on a line which is substantially parallel to a line including S2 and D2. The sources and the detectors are oriented so as to face each other.

As depicted in FIG. 2, the source S1 on the jaw A can be thought of as casting two light beams, A1 and A3, on the detectors D1 and D2, respectively, and the source S2 on the jaw A can be thought of as casting two light beams, A2 and A4, on the detectors D2 and D1, respectively. Likewise, the source S1 on the jaw B can be thought of as casting two light beams, B1 and B3, on the detectors D1 and D2, respectively, and the source S2 on the jaw B can be thought of as casting two light beams, B2 and B4, on the detectors D2 and D1, respectively. The beams A1 and A2 are substantially parallel, as are the beams B1 and B2. (In the convention to be used herein, the beams A1 and B1 are also referred to as the "inner" parallel beams, being closer to the center of the gripper 10, and the beams A2 and B2 are also referred to as the "outer" parallel beams.)

In order to distinguish the source of a lightbeam as detected at the detectors D1 and D2 of each jaw, the light sources S1 and S2 on each jaw are turned on in alternation; e.g., light-beams A1 and A4, which would otherwise be indistinguishable at D1, are not present concurrently. In this way, information about all eight beams is available for controlling the gripper 10.

The configuration of the gripper 10 at any time can be described in terms of 1) the gripper orientation (angular position), 2) the inter-jaw distance, and 3) the position of (the center of) the gripper. The configuration of the gripper 10 is controlled in accordance with the states of the detectors, D1 and D2, for both jaws A and B. Table I shows a reactive control logic table which specifies actions to be taken by the robotic arm, with respect to the gripper 10, in response to the state of the four beams A1, A2, B1, and B2, as detected by the detectors D1 and D2 on the jaws. (A further embodiment is described below which uses the states of the beams A3, A4, B3, and B4). In table I, an "x" indicates that the corresponding beam is interrupted by the object 20 whereas a "." indicates that the corresponding beam clears the object 20 and is detected by the corresponding detector.

TABLE I

| STATE | A2 | A1 | B1 | B2 | ACTION |
|---|---|---|---|---|---|
| 0 | . | . | . | . | Close gripper |
| 1 | . | x | . | . | Move up |
| 2 | . | . | x | . | Move down |
| 3 | . | x | x | . | Rotate in current direction |
| 4 | x | x | x | . | Move towards jaw A in a direction parallel to jaw bodies as they were oriented prior to the last rotation |
| 5 | . | x | x | x | Move towards jaw B in a direction parallel to jaw bodies as they were oriented prior to the last rotation |
| 6 | x | x | . | . | Move up |
| 7 | . | . | x | x | Move down |

TABLE I-continued

| STATE | A2 | A1 | B1 | B2 | ACTION |
|---|---|---|---|---|---|
| 8 | x | x | x | x | Reverse direction of rotation upon first entry; otherwise stop |

In accordance with the embodiment of the method of the present invention set forth in Table I, the computer 4 checks the current state of the light-beams (A1, A2, B1, and B2) and commands the robotic arm 1 to perform the corresponding action listed in Table I. Table I can be implemented in a variety of ways, such as hard-wired logic, in a read-only memory, in software, etc. Each action is performed until the state changes. Because each action is performed in a tight control loop, each movement is very small.

The initial orientation of the gripper 10 is assumed to be at an angle of 0° (i.e., as shown in FIG. 2, with the bodies of the jaws A and B parallel to the x-axis). Moreover, it is assumed that the gripper 10 rotates around its center of symmetry. Also, as used herein, "upward" movement or translation of the gripper means translation in a direction perpendicular to the bodies of the gripper jaws and towards jaw A, whereas "downward" movement means translation in a direction perpendicular to the jaw bodies and towards jaw B. This convention also defines left and right translation (as shown in FIG. 2). Furthermore, the initial current rotational direction of the gripper 10 is arbitrarily chosen to be clockwise and the initial position of the gripper 10 is such that the object 20 is somewhere between the gripper jaws.

With reference to Table I, the gripper is initially in state 0, with the jaws moving together towards the object 20. As the jaws A and B move together, either light-beam A1 or light-beam B1 will first become blocked by the object 20. If A1 is blocked first, i.e., state 1, the gripper 10 is moved upwards, i.e., towards jaw A. If B1 is blocked first, i.e., state 2, the gripper is moved downwards, i.e., towards jaw B. It should be noted here that the spacing between the parallel light-beams on each jaw (i.e., the spacing between the light sources S1 and S2 and the spacing between the detectors D1 and D2) must be large enough so that the smallest incremental motion of the gripper 10 (whether it be the closing or opening of the jaws, the translation of the gripper, or the rotation of the gripper) can cause an inner beam (A1 or B1) to become blocked (or unblocked) without also causing an outer beam (A2 or B2) to become blocked (or unblocked). In other words, the distance between the parallel beams on each jaw must be large enough so that, for example, as the gripper is closing (state 0), the actuating resolution of the robotic arm 1 allows stopping the closing action in time to prevent an outer beam from being broken as well. In this way, operation will transition from state 0 to either state 1 or 2, and not state 6 or 7, respectively.

As a result of either of the actions of state 1 or state 2, both beams A1 and B1 will be unblocked (naturally, both outer beams A2 and B2 will also be unblocked). As such, operation returns to state 0 and the gripper is closed even further until once again state 1 or state 2 is reached. After transitioning a few times between state 0 and state 1 or 2, the gripper will eventually transition from state 0 to state 3, in which both outer beams A1 and B1 are broken. In other words, the several transitions between state 0 and state 1 or 2, results in positioning the gripper 10 so that the object 20 is substantially centered between the jaws A and B.

Once in state 3, the gripper 10 is rotated in the initial rotational direction, i.e., clockwise, which direction is not reversed again until state 8 is reached (as described below).

In the process of rotating (state 3), the gripper may also transition into state 4 or 5, in which both inner beams A1 and B1 are blocked and one of the outer beams A2 or B2 is blocked. (As discussed above, it is assumed that the gripper closes with sufficient precision so that beam A1 or B1 is always interrupted before the beam A2 or B2, respectively, and that both events can be detected separately.) In these states, the gripper 10 is translated in a direction parallel to the jaw bodies as they were oriented prior to the last rotation. It can be seen that if the gripper 10 is moved in a direction parallel to the jaw bodies as they were oriented prior to the last rotation, the center of symmetry of the gripper is thus brought closer to the center of the object 20. In this way, touching the object 20 with the gripper 10 (before obtaining the desired orientation for grasping) is averted.

It is also possible for the gripper 10 to transition into states 6 and 7, which represent more extreme off-centered conditions than states 4 and 5. In states 6 and 7, both parallel beams on one of the jaws are blocked while neither parallel beam on the other jaw is blocked. This condition is corrected by translating the gripper towards the jaw with the blocked beams.

As will be shown below, after a series of rotations, gripper closings, and further translations, in accordance with Table I, the gripper 10 will be at a position and orientation at which the diameter of the object 20 is at the closest local minimum to the gripper's initial orientation which is detectable by the gripper, given the gripper's detection resolution. By thus positioning the gripper 10, the gripper jaws can then be closed to stably grasp the object 20.

Figure 3:
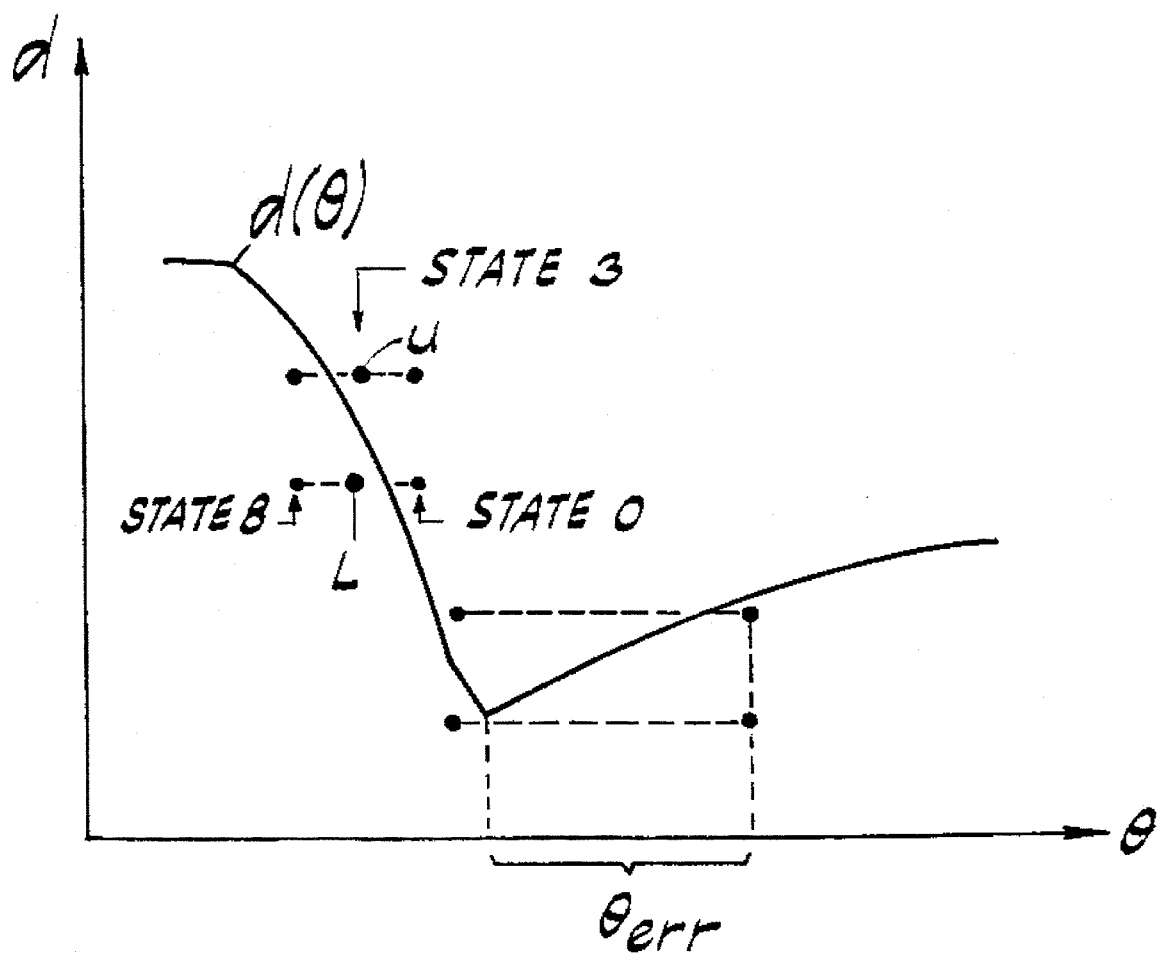
FIG. 3 is a graph of an exemplary diameter function of an object to be grasped.

In describing the operation of the exemplary embodiment, it is helpful to consider the "diameter function", $d(\theta)$, of the object 20, as shown in FIG. 3. $d(\theta)$ is the diameter of the object 20 in the direction $\theta$; i.e., the length of the projection of the object 20 on a line that forms an angle of $\theta$ with the x-axis. Antipodal points pairs correspond to local maxima on the diameter function, and local minima correspond to possible grasp points. The position of each pair of parallel beams (A1, B1 and A2, B2) can be represented by a point on the graph of the diameter function. Rotation of the gripper 10 corresponds to movement of the points along the $\theta$-axis (horizontally). Opening and closing of the gripper corresponds to movement of the points along the d-axis. (It should be noted that the states 1,2,4,5,6,7, in which translations of the gripper occur, are not modeled by the diameter graph.)

Finding a stable grasp orientation can be thought of in terms of finding a local minimum in the diameter function curve. As mentioned above, the gripper 10 finds that local minimum in the diameter function of the object 20 which is closest to the gripper's initial orientation and which is detectable by the gripper. Whether a local minimum in the diameter function $d(\theta)$ can be detected by the gripper depends on the "depth" of the local minimum and the detection resolution of the gripper. The depth of a local minimum in the diameter function is the difference between the diameter at that point and the diameter at the nearest local maximum. The detection resolution of the gripper 10 is the sum of the distance between the beams A1 and A2 and of the distance between the beams B1 and B2 (since the distance between each pair of beams is the same, this sum is equal to twice the distance between the inner and outer beams on one jaw). This sum will be designated hereinafter as $D_{12}$.

As can be seen from Table I, at each step, the gripper 10 is either closed, translated, or rotated so that the gripper jaws can close further. We can think of the operation of the gripper in accordance with Table I as tracking the diameter curve d(θ) using two vertically positioned points, U and L. The lower point L corresponds to the distance between the inner pair of light-beams (A1 and B1), and the upper point U corresponds to the distance between the outer pair of light-beams (A2 and B2). Points U and L are separated by a vertical distance equal to $D_{12}$, the sum of the distances between the inner and outer parallel light beams on each jaw. (It should also be noted that the angled beam pairs A3, B3 and A4, B4 can also be approximately represented by a right and a left point, respectively, which together with points U and L would form the vertices of a diamond. The spacing between the right and left points would be the angle between the crossed beams, A3 and A4, or B3 and B4.)

In order to find a local minimum in the diameter function, i.e., a stable grasp orientation, the gripper is operated, in accordance with Table I, so as to keep the diameter function curve between the two points U and L; i.e., the upper point above the curve and the lower point below it. When this occurs, the gripper is operating in state 3; i.e., the diameter of the object 20 at that orientation (θ) is large enough to block the inner beams (A1 and B1), as represented by the lower point, but not large enough to block the outer beams (A2 and B2), as represented by the upper point.

When the gripper is operating in state 0, both points U and L are above the diameter function curve. As shown in Table I, in state 0, the gripper is actuated to close. A closing of the gripper jaws corresponds to a vertical drop of both points U and L on the d vs θ graph; i.e., d decreases as θ stays constant. When the lower point L falls below the curve with the upper point U still above the curve, operation is then in state 3, in which rotation in the initial rotational direction occurs. As stated above, rotation corresponds to a horizontal motion of the points U and L parallel to the θ-axis. If the initial rotational direction is correct, i.e., the gripper 10 is rotating toward a minimum in the diameter function, the system will eventually come back to state 0, with both points U and L above the diameter function curve. Once in state 0 again, the points U and L will drop as the jaws A and B are brought closer together. In this case, the points U and L move in tandem down the diameter function curve towards a local minimum.

If, however, the initial rotational direction in state 3 was incorrect, the points U and L will eventually fall below the diameter curve as the gripper 10 rotates in the "wrong" direction (i.e., towards an orientation at which the object 20 has a larger diameter). In this case, the operation of the gripper has transitioned into state 8. As shown in Table I, upon first entering state 8, the rotational direction is reversed. In this case, the horizontal movement of the points U and n parallel to the θ-axis is reversed until the point U ends up above the diameter function curve d(θ) and the point L ends up below the curve; i.e., the gripper transitions back to state 3. Any further rotations in state 3 are in the new rotational direction.

State 8 is the only state in which the gripper 10 is rotated with all 4 beams (A1, A2, B1, and B2) interrupted. State 8 can only be entered from states 3, 4 and 5. State 8 cannot be entered directly from states 6 and 7. The outer beam A2, which is blocked in state 6, will be cleared by the upward translation of the gripper performed in state 6. Likewise, the outer beam B2, which is blocked in state 7, will be cleared by the downward translation of the gripper performed in state 7. Once in state 8, the direction of rotation of the gripper is reversed and the search continues in the new direction.

When the gripper 10 enters state 8 for a second time, it is clear that the gripper has crossed a local minimum and that the diameter function has increased since the local minimum by at least $D_{12}$. At this point, there are no further rotations and/or translations of the gripper and the gripper jaws are closed to grasp the object 20.

The above-described embodiment of the gripper 10, operating per Table I, will, however, miss local minima in the diameter function whose depth is less than $D_{12}$, the sum of the distances within the pairs of parallel light-beams. As mentioned above, $D_{12}$ represents the detection resolution limit of the gripper. As $D_{12}$ is decreased to zero, the gripper will miss smaller and smaller local minima, and will ultimately track the diameter curve d(θ) with total precision. Since it is physically impossible, however, for $D_{12}$ to be zero, some error is inevitable. However, if the diameter function of the given object 20 increases very gradually after the local minimum (as is the case in FIG. 3), even a small $D_{12}$ could yield a large angular error $\theta_{err}$ in the grasping position of the gripper from the local minimum. For example, if the object 20 has an ellipse-shaped cross section, with a only a small difference between its minimum and maximum diameters, it may occur that the local minimum is too shallow to be detected by the gripper.

A further embodiment of the robotic gripper of the present invention, overcomes the above-described problem and is capable of finding a local minimum with a resolution which is independent of the beam spacing, but rather dependent on the finer positional resolution of the gripper. Once the gripper enters state 8 a second time, i.e., the gripper has just traversed a valley in the diameter function d(θ), the gripper searches the valley for the actual local minimum. In state 8, however, the gripper cannot perform large rotations because all four parallel beams are interrupted. Rotation over large angular displacements requires that the outer beams A2 and B2 be unblocked so that translational position adjustments can be made to avoid touching the object with the gripper. To overcome this problem, the further embodiment of the gripper has the capability to perform a "back-up" step. A back-up step puts the gripper in the configuration it was in before the last state transition. Each back-up step is a small motion which can be accomplished by saving the previous configuration of the gripper every time the gripper is rotated or the jaws closed.

In this further embodiment, after entering state 8 a second time, the gripper performs a back-up step, after which the gripper is free to rotate. From this point, the gripper will perform a binary search for the local minimum. In performing this binary search, up to three of the last angular positions of the gripper are saved. The current direction of rotation is reversed, and the gripper rotates (while adjusting position) to an angular position halfway between the gripper's two previous positions. The gripper jaws are then closed (again adjusting for position) until all beams are interrupted. After closing the gripper until the outer beams A2 and B2 are both interrupted, the jaw spacing is measured and saved. A back-up step is then performed, thereby opening the gripper. The current angle is saved and rotation is resumed, starting in an arbitrarily-chosen direction. The gripper then rotates to an angular position half-way between its last position and the one of the two previously stored positions which lies in the current direction of rotation. The gripper is then closed until the outer beams A2 and B2 are interrupted and the jaw spacing is measured and compared to the jaw spacing which was measured and saved at the last position. If the new jaw measurement is greater than the previous jaw measurement, the direction chosen was incorrect and a back-up step is performed in which the direction of rotation is reversed and operation is restarted at the last saved angle. Otherwise, the current jaw measurement and angular position are saved and the search proceeds again from this point in an arbitrarily-chosen direction. This procedure is repeated until an iteration in the angular position changes by less than a predetermined error limit.

It is conceivable that at some point, due to inaccuracies or time delays, the gripper 10 could oscillate between a pair of opposing states (e.g., between states 1 and 2, or 4 and 5). This could also happen if the distance between the inner beams A1 and B1 is exactly the diameter of the object 20 in the current orientation. To avoid oscillations, the controlling computer 4 checks to determine whether there has been a gripper closure between those states. If there has been no closure of the gripper, operation is forced to state 0 (close gripper).

Another embodiment of the reactive method of the present invention uses the status of the angled light-beams A3, A4, B3, and B4. It should be noted that the physical embodiment of the gripper 10, as shown in FIG. 2, can be operated, without modification, using this embodiment of the method. In this case, the controlling computer 4 will simply monitor the states of the detectors D2, instead of the detectors D1, when the light sources S1 are activated (for the beams A3 and B3), and will monitor the states of the detectors D1, instead of the detectors D2, when the light sources S2 are activated (for the beams A4 and B4).

Table II shows a reactive control logic table which specifies what actions are taken by the gripper for each of the 16 states defined by the status of the angled beams.

TABLE II

| STATE | A3 | A4 | B4 | B3 | ACTION |
|---|---|---|---|---|---|
| 0 | . | . | . | . | Close gripper |
| 1 | x | . | . | . | Move left and up |
| 2 | . | x | . | . | Move right and up |
| 3 | . | . | x | . | Move left and down |
| 4 | . | . | . | x | Move right and down |
| 5 | x | x | . | . | Move up |
| 6 | . | . | x | x | Move down |
| 7 | x | . | . | x | Rotate clockwise |
| 8 | . | x | x | . | Rotate counter-clockwise |
| 9 | x | . | x | . | Move left |
| 10 | . | x | . | x | Move right |
| 11 | x | x | . | x | Move right, parallel to A4 |
| 12 | x | x | x | . | Move left, parallel to A3 |
| 13 | x | . | x | x | Move right, parallel to B3 |
| 14 | . | x | x | x | Move left, parallel to B4 |
| 15 | x | x | x | x | Check if done |

The translations of the gripper in the states 1 to 4 are performed in a direction perpendicular to the corresponding beam that is interrupted. The translations in states 5 and 6 are, as before, in a direction perpendicular to the bodies of the jaws, with up being towards jaw A and down being towards jaw B. The translations in states 9 and 10 are parallel to the bodies of the jaws, as indicated by the left and right arrows in FIG. 2. The translations in states 11 to 14 are performed in a direction parallel to one of the angled beams, as indicated.

Figure 5:
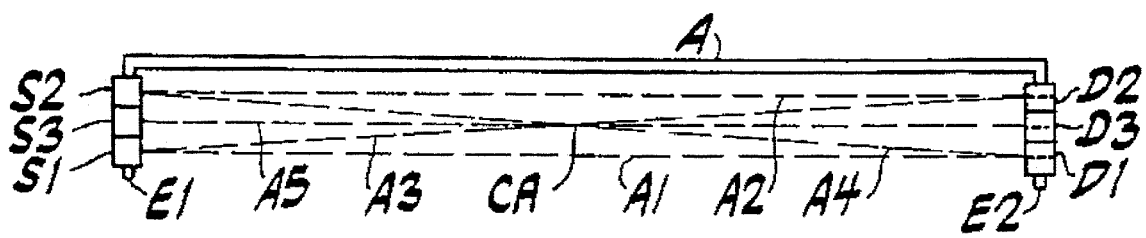
FIG. 5 is a plan view of a further embodiment of the robotic gripper of the present invention.
Figure 4A:
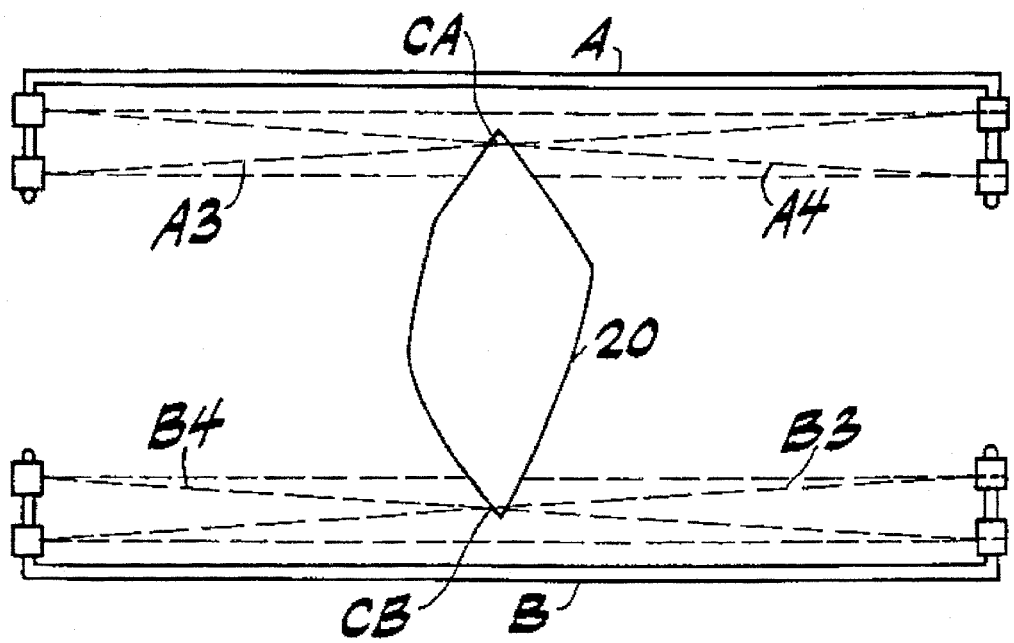
FIGS. 4A and 4B are plan views of the reactive robotic gripper of the present invention as used to grasp polygonal objects.
Figure 4B:
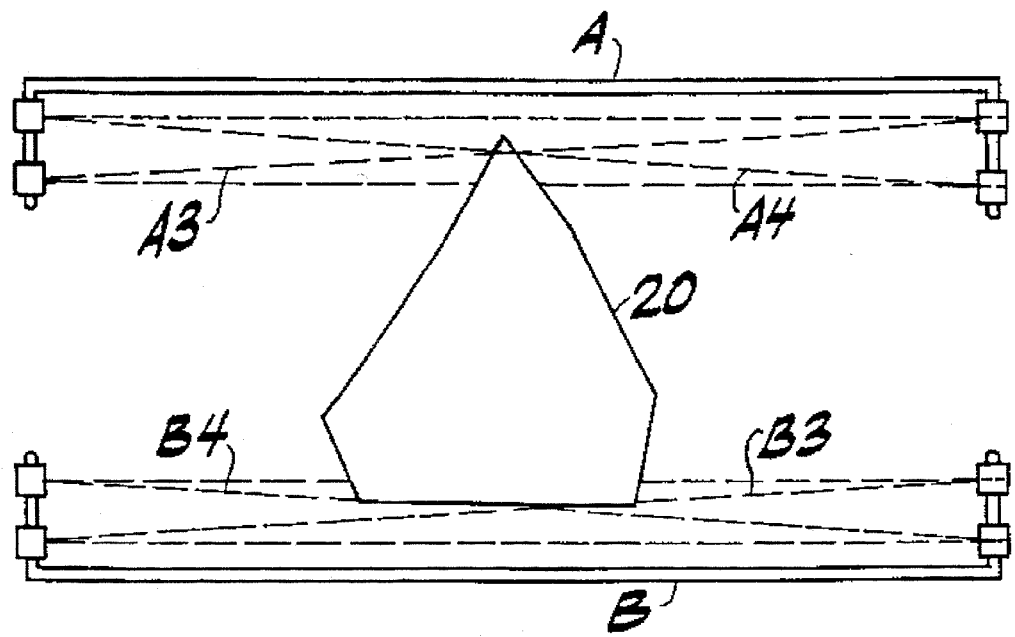

In state 15, the gripper must be able to discriminate between the two situations depicted in FIGS. 4A and 4B. This can be accomplished, as shown in FIG. 5, by adding to the jaw A another beam, A5, which is parallel to beams A1 and A2 and passes through the intersection point CA of beams A3 and A4. Similarly, a beam B5, which is parallel to beams B1 and B2 and passes through the intersection point CB of beams B3 and B4 is added to jaw B. The addition of the beams A5 and B5 entails the addition of a light source S3 on the jaw extension E1 on each jaw, with the source S3 positioned equidistantly between the sources S1 and S2.

Additionally, a detector D3 is added on the jaw extension E2 on each jaw, with the detector D3 positioned equidistantly between the detectors D1 and D2.

The beams A5 and B5 allow the gripper to determine whether there is a vertex of the object 20 at the point CA or CB, respectively. Having vertices at both points CA and CB is to be avoided. In such a case, the diameter of the object 20 is at a local maximum and a grasp of the object would be of low stability.

A vertex at the point CB, for example (as shown in FIG. 4a), unlike a flat or near-flat surface (as shown in FIG. 4b), cannot block both the beams B3 and B4 without also blocking the beam B5. The use of the beams A5 and B5 thus allows the operation of the gripper operation to be entirely table-driven, instead of having to rely on a local model of the object being grasped. In fact, by moving each of these beams slightly further from the body of its respective jaw, it is possible to eliminate any cases of having vertices on both sides, such that the line joining the vertices is almost orthogonal to the jaws.

If the gripper detects vertices at both the points CA and CB, it gets out of such a configuration by performing a small rotation in the same direction as the previous rotation.

The beam A5 can be replaced by using either the beam A1 or the beam A2 and repositioning the gripper, assuming precise measurement data for the current jaw spacing is available. Likewise, the beam B5 can be replaced by the beam B1 or B2, in a similar manner.

What is claimed is:

1. A reactive robotic system comprising:
   a robotic gripper with first and second jaws for grasping an object therebetween, each jaw including:
      a first jaw extension provided with at least two light sources, and
      a second jaw extension provided with at least two light detectors,
   which sources and detectors of each jaw are mounted so as to generally face each other so that the detectors detect whether light-beams emitted from the sources are blocked by the object; and
   a reactive control system coupled to the robotic gripper for controlling the gripper to perform a predetermined action in accordance with each detected state of the light-beams so that after a series of actions, the gripper is in a configuration to stably grasp the object at a local minimum diameter of the object.

2. The reactive robotic system of claim 1, wherein the jaws are substantially parallel to each other and the light beams emitted by the sources and detected by the detectors of each jaw are substantially parallel to the respective jaw and include an inner light beam and an outer light beam.

3. The reactive robotic system of claim 2, wherein the reactive control system controls the gripper to:
   move the jaws together when none of the light beams are blocked;
   translate in a direction perpendicular to the jaws when at least one of the light beams of only one jaw are blocked;
   rotate in a forward direction when only the inner light beams of both jaws are blocked;
   translate in a direction oblique to the jaws when both light beams of one jaw and only one light beam of the other jaw are blocked; and
   rotate in a reverse direction or stop when all light beams are blocked.

4. The reactive robotic system of claim 1, wherein the actions performed by the gripper include closing and opening of the jaws, translation, and rotation.

5. The reactive robotic system of claim 1, wherein the reactive control system includes:
   a robotic arm onto which the gripper is attached, for actuating the actions of the gripper;
   an arm controller coupled to the robotic arm for controlling actuation of the robotic arm;
   a reactive control interface coupled to the detectors for receiving signals from the detectors indicative of the state of the light-beams; and
   a controlling computer coupled to the reactive control interface and to the arm controller for receiving information on the state of the light-beams, and for controlling the robotic arm in accordance with the state of the light-beams.

6. The reactive robotic system of claim 1, wherein the jaws are substantially parallel to each other, and a first and second of the light beams emitted by the sources and detected by the detectors on each jaw intersect each other, with the first light beams being parallel to each other and the second light beams being parallel to each other.

7. The reactive robotic system of claim 6, wherein the reactive control system controls the gripper to:
   move the jaws together when none of the light beams are blocked;
   translate in a direction perpendicular to a blocked light beam when only one light beam is blocked;
   translate in a direction perpendicular to the jaws when both beams of only one jaw are blocked;
   rotate in a forward direction when only the first light beams of both jaws are blocked;
   rotate in a reverse direction when only the second light beams of both jaws are blocked;
   translate in a direction parallel to the jaws when only the first light beam of one jaw and the second light beam of the other jaw are blocked;
   translate in a direction parallel to one of the light beams when only one of the light beams is unblocked; and
   check for a stable grasp configuration when all of the light beams are blocked.

8. The reactive robotic system of claim 6, wherein a third light source is arranged on the first jaw extension of each jaw and a third light detector is arranged on the second jaw extension of each jaw, the third light source emitting and the third light detector detecting a third light beam which is substantially parallel to the jaw and which intersects the first and second light beams.

9. A method for reactively controlling a robotic gripper comprising the steps of:
   emitting at least two light-beams from a first jaw extension of each of two jaws of the gripper;
   detecting the light-beams at a second jaw extension of each of the two laws to determine whether the light-beams are blocked by an object to be grasped by the gripper; and
   controlling the gripper to perform a predetermined action in accordance with each detected state of the light-beams so that after a series of actions, the gripper is in a configuration to stably grasp the object at a local minimum diameter of the object.

10. The method for reactively controlling a robotic gripper of claim 9, wherein the jaws are substantially parallel to each other and the light beams emitted and detected at each jaw are substantially parallel to the respective jaw and include an inner light beam and an outer light beam.

11. The method for reactively controlling a robotic gripper of claim 10, wherein the step of controlling the gripper includes controlling the gripper to:
   move the jaws together when none of the light beams are blocked;
   translate in a direction perpendicular to the jaws when at least one of the light beams of only one jaw are blocked;
   rotate in a forward direction when only the inner light beams of both jaws are blocked;
   translate in a direction oblique to the jaws when both light beams of one jaw and only one light beam of the other jaw are blocked; and
   rotate in a reverse direction or stop when all light beams are blocked.

12. The method for reactively controlling a robotic gripper of claim 9, wherein the actions performed by the gripper include closing and opening of the jaws, translation, and rotation.

13. The method for reactively controlling a robotic gripper of claim 9, wherein the actuating step further includes:
   receiving signals from the detectors indicative of the state of the light-beams;
   determining the actions to be performed by the gripper in accordance with the state of the light-beams; and
   controlling a robotic arm onto which the gripper is attached to actuate the actions of the gripper.

14. The method for reactively controlling a robotic gripper of claim 9, wherein the jaws are substantially parallel to each other and a first and second of the light beams emitted and detected at each jaw intersect each other, with the first light beams being parallel to each other and the second light beams being parallel to each other.

15. The method for reactively controlling a robotic gripper of claim 14, wherein the step of controlling the gripper includes controlling the gripper to:
   move the jaws together when none of the light beams are blocked;
   translate in a direction perpendicular to a blocked light beam when only one light beam is blocked;
   translate in a direction perpendicular to the jaws when both beams of only one jaw are blocked;
   rotate in a forward direction when only the first light beams of both jaws are blocked;
   rotate in a reverse direction when only the second light beams of both jaws are blocked;
   translate in a direction parallel to the jaws when only the first light beam of one jaw and the second light beam of the other jaw are blocked;
   translate in a direction parallel to one of the light beams when only one of the light beams is unblocked; and
   check for a stable grasp configuration when all of the light beams are blocked.

16. The method for reactively controlling a robotic gripper of claim 14, comprising the steps of emitting a third light beam from the first jaw extension of each of the jaws of the gripper and detecting the third light beam at the second jaw extension of each of the jaws, wherein the third light beam of each jaw is substantially parallel to the jaw and intersects the first and second light beams.

* * * * *